July 17, 1956 H. A. RHODES 2,755,445
INTERCONNECTION OF TRANSMISSION LINES
Filed Feb. 11, 1955 2 Sheets-Sheet 1
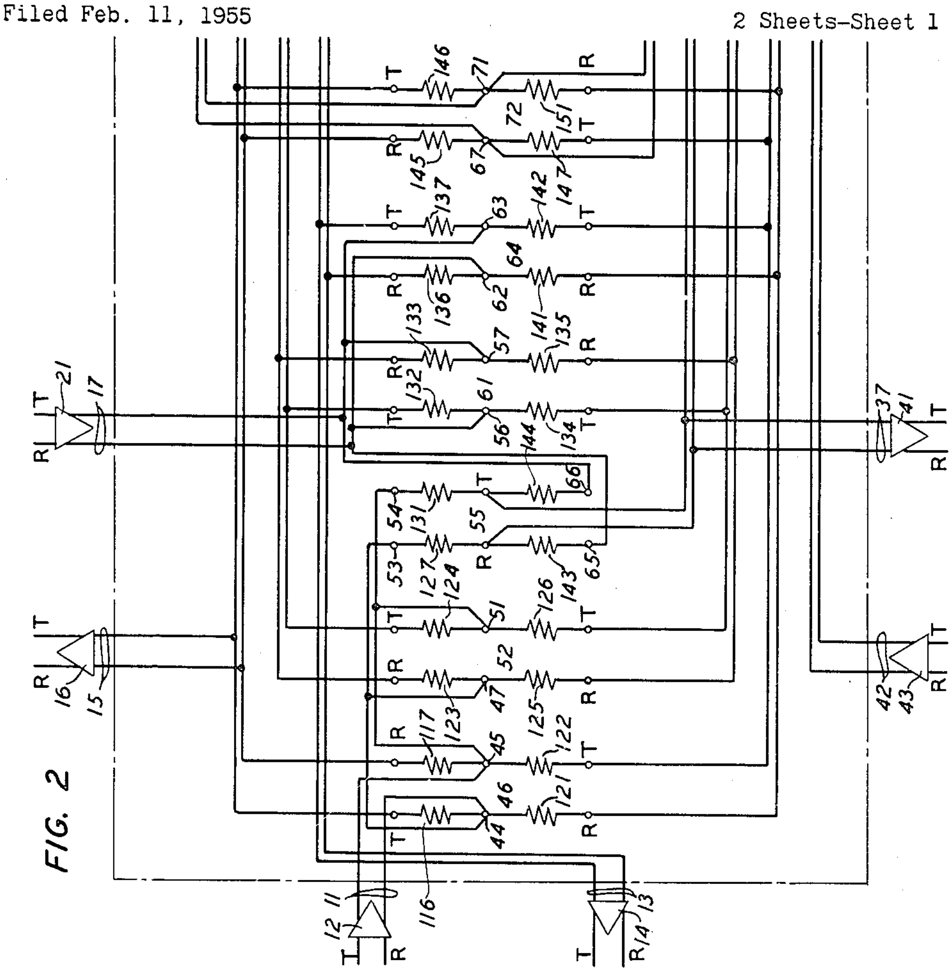
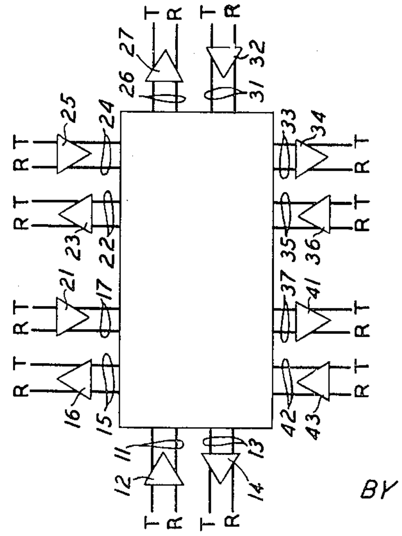
FIG. 1
INVENTOR
H. A. RHODES
BY I. A. McCorkendale
ATTORNEY July 17, 1956 H. A. RHODES 2,755,445

INTERCONNECTION OF TRANSMISSION LINES

Filed Feb. 11, 1955 2 Sheets-Sheet 2

INVENTOR
H. A. RHODES
BY F. A. McCorkendale
ATTORNEY

United States Patent Office 2,755,445

Patented July 17, 1956

2,755,445

INTERCONNECTION OF TRANSMISSION LINES

Harold A. Rhodes, Bloomfield, N. J., assignor to American Telephone and Telegraph Company, a corporation of New York Application February 11, 1955, Serial No. 487,490

7 Claims. (Cl. 333—11)

Figure 3:
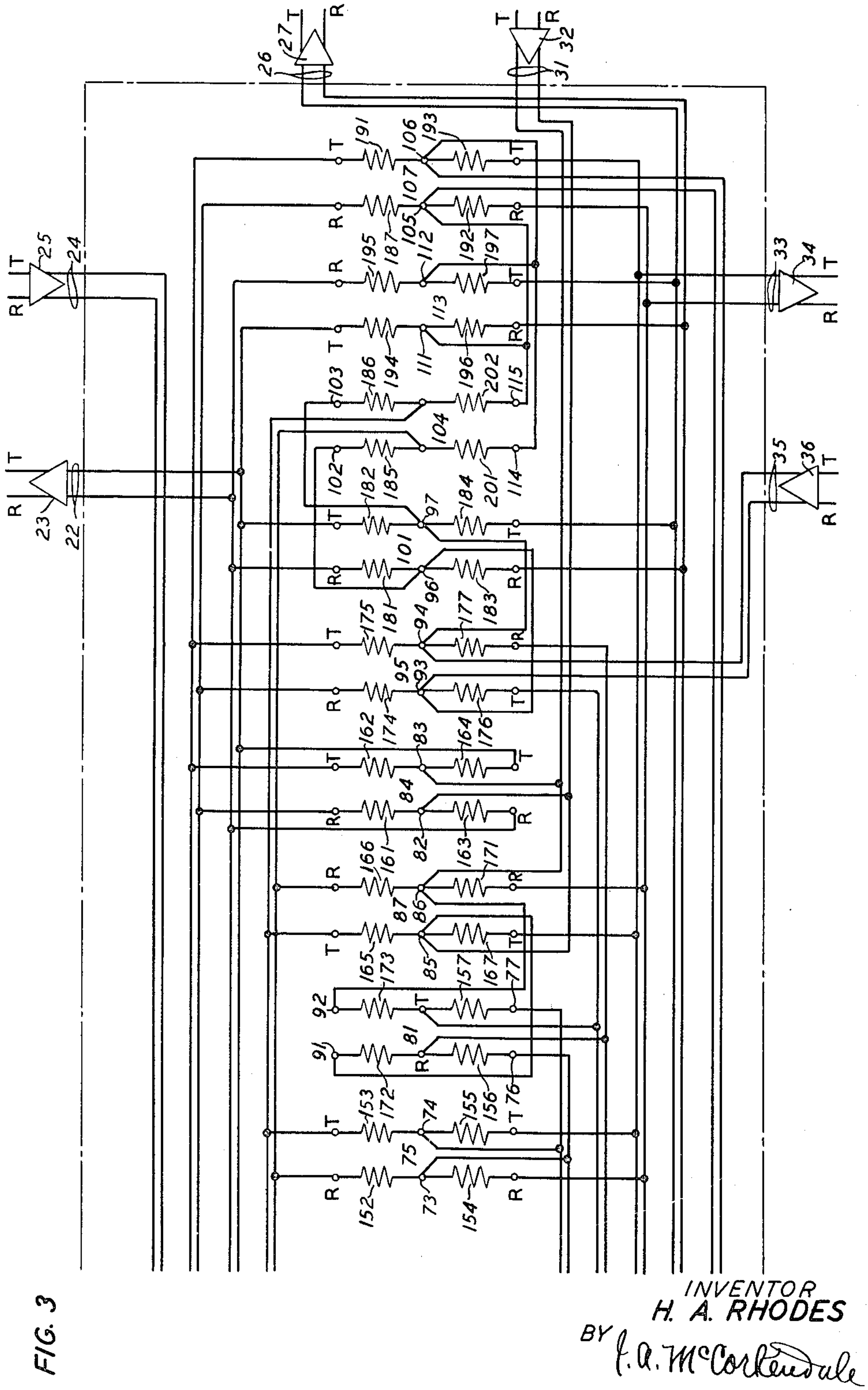

This invention relates to a transmission system, and more particularly to a transmission system in which a plurality of pairs of transmission lines are so interconnected that each pair is enabled to transmit to, and receive from, each of the other pairs of lines.

An object of the invention is to interconnect a plurality of pairs of lines in mutually communicative relation while maintaining a high loss between the transmitting leg and associated receiving leg of any given pair of lines.

Another object of the invention is the substantial elimination of the effects of crosstalk between the various pairs of interconnected lines.

In modern telephone central office practice, in connection, particularly, with private line telephone, telegraph or telephotograph channels, it is often desirable to associate a plurality of four-wire circuits so that each transmitting line, or transmitting leg, may transmit to all the receiving lines, or legs, except its own receiving leg. In order to prevent distortion and for other obvious reasons there should be no transmission to its own receiving leg. An arrangement of this nature in accordance with which four groups of four-wire circuits may be so interconnected which has been extensively used in the past is disclosed in F. A. Cowan-G. J. Goetz United States Patent 2,035,536. With increasing use of network facilities there has recently arisen a need for an interconnecting arrangement which would accommodate a larger number of groups than the four accommodated by the Cowan et al. arrangement. In accordance with the novel features of the present invention an interconnecting arrangement is provided which accommodates six groups of four-wire circuits.

In accordance with a specific embodiment of the invention six four-wire lines are interconnected by means of fifteen bilateral transducers. Each transducer comprises four resistors, all of the resistors being of exactly equal value. Each transducer is provided with two mid-point terminals and four external terminals.

In accordance with a particular feature of the invention, each transmitting line, or leg, is connected in parallel to the mid-point terminals of a respective two of the transducers and to two external terminals of a third transducer. Connections to the respective receiving legs are thereby set up through the respective transducers in a novel and efficient manner as will be clear from the following detailed description.

In accordance with a still further feature of the invention a novel transposition arrangement is provided which is effective to prevent effective transmission over certain undesired paths.

Full understanding of the arrangement contemplated by the present invention as well as appreciation of the various advantageous features may be gained from consideration of the following detailed description in connection with the accompanying drawings in which:

Fig. 1 illustrates schematically the interconnection of six four-wire circuits; and Figs. 2 and 3 show in detail the interconnecting arrangement for the six four-wire circuits.

Referring now to Fig. 1, there are represented schematically six four-wire lines which are to be interconnected. As indicated, each line includes a two-wire transmitting leg and a two-wire receiving leg and each leg is provided with amplifying means. That is, the first four-wire line comprises transmitting leg 11 with amplifier 12, and receiving leg 13 with amplifier 14. In accordance with usual practice the lines are designated "tip" and "ring" and in the drawings the symbols "T" and "R" are used to indicate the tip and ring sides of the respective lines.

The other four-wire lines comprise, respectively, receiving leg 15 with amplifier 16, and transmitting leg 17 with amplifier 21; receiving line 22 with amplifier 23 and transmitting line 24 with amplifier 25; receiving line 26 with amplifier 27 and transmitting line 31 with amplifier 32; receiving line 33 with amplifier 34 and transmitting line 35 with amplifier 36; and receiving line 37 with amplifier 41 and transmitting line 42 with amplifier 43.

In such a system it is desirable that the arrangement be such that, when there is transmission into any of the six transmitting legs, there should be transmission to all receiving legs except that one paired with the particular transmitting leg. That is, assuming we are transmitting into leg 11, there should be transmission to receiving legs 15, 22, 26, 33 and 37, but there should be no detectable transmission to receiving leg 13. Also in the instance mentioned for example, there should be no transmission from transmitting leg 11 to the other transmitting legs 17, 24, 31, 35 or 42. In view of the involved connecting scheme that it is necessary to provide in order to set up all of the "desired" paths, it will be obvious, and readily discernible from consideration of the detailed description and drawings, that physical connections are in fact present which, in effect, establish the undesired paths. Because of the novel circut features contemplated by the present invention, however, these undesired paths do not become effective. This is accomplished, largely, by the novel transposition arrangement and by the novel manner in which similar, bilateral transducers, are connected between a given transmitting leg and the five receiving legs to which there is to be transmission.

By reference now to Figs. 2 and 3, which should be joined left to right for reading, it will be noted that fifteen bilateral transducers have been provided. Each transducer comprises four resistors and each is provided with four external terminals and two mid-point terminals. Each of the sixty resistors involved is carefully selected and matched so that all are of exactly the same resistance value. It will be noted that each of the respective transmitting legs is connected to the mid-point terminals of two of the respective transducers and to one pair of external terminals of a third transducer.

Thus, transmitting leg 11 is connected to mid-point terminals 44 and 45 of transducer 46; mid-point terminals 47 and 51 of transducer 52 and external terminals 53 and 54 of transducer 55. Correspondingly, transmitting leg 17 is connected to mid-point terminals 56 and 57 of transducer 61, mid-point terminals 62 and 63 of transducer 64, and external terminals 65 and 66 of transducer 55. Also, transmitting leg 24 is connected to mid-point terminals 67 and 71 of transducer 72, mid-point terminals 73 and 74 of transducer 75, and external terminals 76 and 77 of transducer 81.

Further, transmitting leg 31 is connected to mid-point terminals 82 and 83 of transducer 84, mid-point terminals 85 and 86 of transducer 87 and external terminals 91 and 92 of transducer 81. Transmitting leg 35 is connected to mid-point terminals 93 and 94 of transducer 95, mid-point terminals 96 and 97 of transducer 101 and external terminals 102 and 103 of transducer 104. Finally transmitting leg 42 is connected to mid-point terminals 105 and 106 of transducer 107, mid-point terminals 111 and 112 of transducer 113 and external terminals 114 and 115 of transducer 104.

This novel arrangement of connecting each transmitting leg to the mid-point terminals of two of the transducers and to two of the external terminals of a third transducer is effective to set up the transmission paths from a respective transmitting leg to the five desired rereceiving legs. That is, from the mid-point terminals of a transducer, transmission through the upper pair of resistors leads to one of the receiving legs while transmission through the lower pair leads to another of the receiving legs. Thus with regard to the connection of transmitting leg 11 to mid-point terminals 44 and 45 of transducer 46, we pass through the upper pair of resistors 116 and 117 directly to receiving leg 15 and we pass through the lower pair of resistors 121 and 122 directly to receiving leg 26. By "directly," it is meant that no other resistors are included in the path traced.

From the connection of transmitting leg 11 to mid-point terminals 47 and 51 of transducer 52, we pass through the upper pair of resistors 123 and 124 directly to receiving leg 22, and through the lower pair of resistors 125 and 126 directly to receiving leg 33. From external terminals 53 and 54 of transducer 55 we pass through resistors 127 and 131 directly to receiving leg 37 thereby completing the desired transmission paths from transmitting leg 11 to receiving legs 15, 22, 26, 33 and 37.

In the same way the paths may be traced for each of the other transmitting legs to the desired five receiving legs. Thus with regard to the connection of transmitting leg 17 to mid-point terminals 56 and 57 of transducer 61, we pass through the upper pair of resistors 132 and 133 directly to receiving leg 22, and through the lower pair of resistors 134 and 135 directly to receiving leg 33. From mid-point terminals 62 and 63 of transducer 64 we pass through the upper pair of resistors 136 and 137 directly to receiving leg 13, and through the lower pair of resistors 141 and 142 directly to receiving leg 26. From external terminals 65 and 66 of transducer 55 we pass through resistors 143 and 144 directly to receiving leg 37, thereby completing the desired transmitting paths from transmitting leg 17 to receiving legs 22, 26, 33, 37 and 13.

With regard to the connection of transmitting leg 24 to mid-point terminals 67 and 71 of transducer 72, we pass through the upper pair of resistors 145 and 146 directly to receiving leg 15 and through the lower pair of resistors 147 and 151 directly to receiving leg 26. From mid-point terminals 73 and 74 of transducer 75 we pass through the upper pair of resistors 152 and 153 directly to receiving leg 13 and through the lower pair of resistors 154 and 155 directly to receiving leg 33. From external terminals 76 and 77 of transducer 81 we pass through resistors 156 and 157 directly to receiving leg 37 thus completing the desired transmitting paths from transmitting leg 24 to receiving legs 27, 33, 37, 13 and 15.

With regard to the connection of transmitting leg 31 to mid-point terminals 82 and 83 of transducer 84, we pass through the upper pair of resistors 161 and 162 directly to receiving leg 15 and through the lower pair of resistors 163 and 164 directly to receiving leg 22. From mid-point terminals 85 and 86 of transducer 87 we pass through the upper pair of resistors 165 and 166 directly to receiving leg 13 and through the lower pair of resistors 167 and 171 directly to receiving leg 33. From external terminals 91 and 92 of transducer 81 we pass through resistors 172 and 173 directly to receiving leg 37 thereby completing the desired transmission paths from transmitting leg 31 to receiving legs 33, 37, 13, 15 and 22.

Considering now the connection of transmitting leg 35 to mid-point terminals 93 and 94 of transducer 95 we pass through the upper pair of resistors 174 and 175 directly to receiving leg 15 and through the lower pair of resistors 176 and 177 to receiving leg 37. From mid-point terminals 96 and 97 of transducer 101 we pass through the upper pair of resistors 181 and 182 directly to receiving leg 22 and through the lower pair of resistors 183 and 184 directly to receiving leg 26. From external terminals 102 and 103 of transducer 104 we pass through resistors 185 and 186 directly to receiving leg 13 thereby completing the desired transmission paths from transmitting leg 35 to receiving legs 37, 13, 15, 22 and 26.

Finally, with regard to the connection of transmitting leg 42 to mid-point terminals 105 and 106 of transducer 107, we pass through the upper pair of resistors 187 and 191 directly to receiving leg 15 and through the lower pair of resistors 192 and 193 directly to receiving leg 33. From mid-point terminals 111 and 112 of transducer 113 we pass through the upper pair of resistors 194 and 195 directly to receiving leg 22 and through the lower pair of resistors 196 and 197 directly to receiving leg 26. From external terminals 114 and 115 of transducer 104 we pass through resistors 201 and 202 directly to receiving leg 13 thereby completing the desired transmission paths from transmitting leg 42 to receiving legs 13, 15, 22, 26 and 33.

There has been traced above, therefore, all the desired transmission paths provided by the invention, i. e. paths whereby each transmitting leg may transmit to all of the receiving legs except its own receiving leg. However, in providing these desired paths, there have been, as pointed out above, necessarily established connections which, except for the novel features of the invention, would result in undesired transmission such as transmission from one transmitting leg to another transmitting leg, or transmission from a transmitting leg to its own receiving leg. In order to fully illustrate the efficiency and novelty of the arrangement contemplated by the present invention, these undesired paths will be traced and it will be pointed out how they are rendered ineffective.

First, as has been pointed out above, there should be no effective transmission from a transmitting leg to its own receiving leg as this will result in annoying echoes and distortion at the transmitting station. That is, for example, when transmitting into transmitting leg 11 there should be no effective transmission to its own receiving leg 13. Let us trace the physical paths which exist between transmitting leg 11 and receiving leg 13. First a path may be traced through resistors 121 and 122 of transducer 46 and resistors 141, 142, 136 and 137 of transducer 64 to receiving leg 13. A second path is traced through resistors 121 and 122 of transducer 46, resistors 147 and 151 of transducer 72 and resistors 152 and 153 of transducer 75 to receiving leg 13. A third path is traced through resistors 121 and 122 of transducer 46, resistors 183 and 184 of transducer 101 and resistors 185 and 186 of transducer 104 to receiving leg 13. A fourth path is traced through resistors 121 and 122 of transducer 46, resistors 196 and 197 of transducer 113, and resistors 201 and 202 of transducer 104 to receiving leg 13.

It will be noted that, with regard to the four paths just traced, each includes three pairs of resistors instead of the single pair included in each of the desired paths previously traced. Also that two of the paths include transposition, i. e. reversal with respect to tip and ring, while the other two are straight, i. e. do not include transposition. Thus with regard to receiving leg 13, the output of two of the parallel paths is of opposite phase to that of the other two so that the net transmission to receiving leg 13 over the undesired paths connecting transmitting leg 11 to receiving leg 13 is zero.

Other similar undesired paths connecting transmitting leg 11 and receiving leg 13 may be traced, and it will be found again that they are rendered ineffective because of the novel transposition arrangement provided by the invention. A first path of the second group is traced through resistors 116 and 117 of transducer 46, resistors 145 and 146 of transducer 72 and resistors 152 and 153 of transducer 75 to receiving leg 13. A second path of this group is traced through resistors 116 and 117 of transducer 46, resistors 161 and 162 of transducer 84, and resistors 165 and 166 of transducer 87 to receiving leg 13. A third path of the group is traced through resistors 116 and 117 of transducer 46, resistors 174 and 175 of transducer 95, and resistors 185 and 186 of transducer 104 to receiving leg 13. The fourth path of the group is traced through resistors 116 and 117 of transducer 46, resistors 187 and 191 of transducer 107, and resistors 201 and 202 of transducer 104 to receiving leg 13. It will be noted with regard to this group of undesired paths that the first and third include transposition and that the second and fourth are straight. The net energy delivered to receiving leg 13 over the four parallel paths is, therefore, zero.

Other groups of undesired connecting paths from transmitting leg 11 to receiving leg 13 may be traced for each of the other transducer connections of leg 11. For example a first such path of a third group is traced through resistors 123 and 124 of transducer 52, resistors 132 and 133 of transducer 61, and resistors 136 and 137 of transducer 64 to receiving leg 13. A second path of this group is traced through resistors 123 and 124, resistors 163 and 164 of transducer 84 and resistors 165 and 166 of transducer 87 to receiving leg 13. A third path of the group is traced through resistors 123 and 124 of transducer 52, resistors 181 and 182 of transducer 101, and resistors 185 and 186 of transducer 104 to receiving leg 13. The fourth path of the group is traced through resistors 123 and 124 of transducer 52, resistors 194 and 195 of transducer 113 and resistors 201 and 202 of transducer 104 to receiving leg 13. It will be noted with regard to the above group of parallel, undesired, paths that the first two include transposition and the second two are straight. Net transmission to receiving leg 13 is, therefore, zero.

Similar groups of paths from transmitting leg 11 to receiving leg 13 may be traced from the remaining two transducer connections of transmitting leg 11, i. e. resistors 125 and 126 of transducer 52 and resistors 127 and 131 of transducer 55, respectively, and it will be found as above with regard to each group, that is, that one pair of lines will be of opposite phase with regard to another pair and that net transmission over the paths to receiving leg 13 will be zero.

Now, as also pointed out above, it is undesirable that there be effective transmission from a transmitting leg to any other transmitting leg. That is, for example, when transmitting into transmitting leg 11 there should be no effective transmission to transmitting leg 17. Let us trace the connecting paths, undesired, which exist between transmitting legs 11 and 17 and determine whether or not they are effective paths. First we find a path from resistors 123 and 124 of transducer 52 and resistors 132 and 133 of transducer 61 to transmitting leg 17. A second path is through resistors 121 and 122 of transducer 46, and resistors 141 and 142 of transducer 64 to transmitting leg 17. A third path is through resistors 127, 131, 143 and 144 of transducer 55 to transmitting leg 17. A fourth path is through resistors 125 and 126 of transducer 52 and resistors 134 and 135 of transducer 61 to transmitting leg 17. It will be noted with regard to this group of parallel, undesired paths, that the first and fourth include transposition and that the second and third are straight. The net transmission to transmitting leg 17 over the paths is, therefore, zero.

Similar groups of parallel paths between transmitting leg 11 and transmitting legs 24, 31, 35 and 42 may be traced, and it will be found, as above, that for each group half of the lines are of opposite phase to the other half so that, as a result, the net transmission over the parallel lines is zero.

Since there is frequently a crosstalk path or bridge between the transmitting and receiving amplifier of each pair of lines, it will be apparent that there exists another source of possible undesired paths between each pair of lines. For example, when transmitting into transmitting leg 11, six of these undesired paths back to receiving leg 13 are set up through these crosstalk bridges, first, directly from transmitting amplifier 12 to receiving amplifier 14 and then the five paths setup, respectively, between receiving amplifier 16 and transmitting amplifier 21; receiving amplifier 23 and transmitting amplifier 25; receiving amplifier 27 and transmitting amplifier 32; receiving amplifier 34 and transmitting amplifier 36; and, finally, receiving amplifier 41 and transmitting amplifier 43. However, it will be observed that of these six crosstalk paths the first, third and fifth are straight, i. e., contain no transposition, while the second, fourth and sixth are transposed. The net result is, therefore, that there is no effective transmission over the six parallel paths from transmitting leg 11 to receiving leg 13. This will be true with regard to the similar group of six crosstalk paths which are set up between each of the other transmitting legs and the associated receiving legs when transmitting into the other transmitting legs.

While certain specific embodiments of the invention have been selected for detailed description, the invention is not, of course, limited in its application to the embodiments described. The embodiments which have been described should be taken as illustrative rather than restrictive thereof.

What is claimed is:

1. In combination six pairs of lines, each pair consisting of a two-wire transmitting leg and a two-wire receiving leg, means interconnecting said lines to enable each transmitting leg to transmit effectively to all of the receiving legs of the others of said pairs, and means for preventing effective transmission between the respective transmitting legs and between the transmitting leg and the receiving leg of the same pair, said first means including a plurality of transducers each comprising two pairs of resistors of equal value, each of said transducers having mid-point terminals common to one of the transmitting legs and to respective paths to two of the receiving legs, each of said paths including a respective pair of said resistors, and said second means including transpositions in certain of the paths connecting each transmitting leg to each of the receiving legs and to the remaining transmitting legs.

2. In an interconnecting circuit for a plurality of pairs of lines, each pair of lines comprising a two-wire transmitting leg and a two-wire receiving leg, a plurality of transducers each comprising two attenuators, each attenuator having a mid-point terminal and two external terminals, paths connecting each of said transmitting legs to the respective mid-point terminals of a first and a second of said transducers and to two external terminals of a third of said transducers, and additional paths connecting the respective external terminals of the first and second of said transducers and the mid-point terminals of the third of said transducers to respective ones of said receiving legs whereby to complete desired transmission paths between each transmitting leg and the receiving leg of each of the other pairs of lines, certain of said connecting paths including transposition and the others of said connecting paths not including transposition.

3. In an interconnecting circuit for a plurality of pairs of lines each pair of lines comprising a two-wire transmitting leg and a two-wire receiving leg, a plurality of transducers each comprising two attenuators, each attenuator having a mid-point terminal and two external terminals, paths connecting each of said transmitting legs to the respective mid-point terminals of a first and a second of said transducers and to two external terminals of a third of said transducers, additional undesired transmission paths connecting each transmitting leg to each of the other transmitting legs, and undesired transmission paths connecting each transmitting leg to the receiving leg of the same pair of lines, certain only of said paths containing transpositions, the transposition points being so located that, with regard to said undesired transmission paths, a number containing transposition are paired against an equal number without transposition so that the effective transmission over any group of undesired transmission paths is substantially zero.

4. In an interconnecting circuit for a plurality of pairs of lines, each pair of lines comprising a two-wire transmitting leg and a two-wire receiving leg, a plurality of transducers each comprising four resistors of equal value, each group of four resistors comprising two pairs of resistors connected in series, each of said transducers having two mid-point terminals and four external terminals, paths connecting each of said transmitting legs to the respective mid-point terminals of a first and a second of said transducers and to two external terminals of a third of said transducers, and additional paths connecting the respective external terminals of the first and second of said transducers and the mid-point terminals of the third of said transducers to respective ones of said receiving legs, certain of said paths including transposition and others of said paths not including transposition.

5. In an interconnecting circuit for six pairs of lines, each pair of lines comprising a two-wire transmitting leg and a two-wire receiving leg, a plurality of transducers each comprising four resistors of equal value each group of four resistors comprising two pairs of resistors connected in series, each of said transducers having two mid-point terminals and four external terminals, paths connecting each of said transmitting legs to the respective mid-point terminals of a first and a second of said transducers and to two external terminals of a third of said transducers, and additional paths connecting the respective external terminals of the first and second of said transducers and the mid-point terminals of the third of said transducers to respective ones of said receiving legs, certain of said paths including transposition and the others of said paths not including transposition.

6. In an interconnecting circuit for a plurality of pairs of lines, each pair consisting of a two-wire transmitting leg and a two-wire receiving leg, a plurality of transducers each of said transducers comprising four resistances of equal value, each group of four resistances being connected in the form of series connected pairs, an individual attenuating path from the transmitting leg of each of said pairs of lines to the receiving leg of each of the other of said pairs of lines, each of said individual attenuating paths including respectively, two of said resistances, additional attenuating paths from the transmitting leg of each of said pairs of lines to the transmitting legs of each of the other of said pairs of lines, each of said additional attenuating paths including a number greater than two of said resistances, and a bridging path between the transmitting leg and receiving leg of each of said pairs of lines whereby the possibility exists of undesired crosstalk between the transmitting leg and receiving leg of each of said pairs of lines, certain of said attenuating paths including transposition, the transposition points being so located that, with regard to said additional attenuating paths between any pair of transmitting legs, half of said paths include transposition and half do not include transposition, and with regard to the possible crosstalk paths between any pair of lines, half include transposition and half do not include transposition.

7. In an interconnecting circuit for six pairs of lines, each pair of lines comprising a two-wire transmitting leg and a two-wire receiving leg, a plurality of transducers each comprising four resistors of equal value, each group of four resistors comprising two pairs of resistors connected in series, each of said transducers having two mid-point terminals and four external terminals, paths connecting each of said transmitting legs to the respective mid-point terminals of a first and a second of said transducers and to two external terminals of a third of said transducers, additional paths connecting the respective external terminals of the first and second of said transducers and the mid-point terminals of the third of said transducers to respective ones of said receiving legs whereby to complete desired transmission paths between each transmitting leg and the receiving leg of each of the other pairs of lines, undesired transmission paths connecting each transmitting leg to each of the other transmitting legs, and undesired transmission paths connecting each transmitting leg to the receiving leg of the pair of lines, certain only of said paths containing transpositions, the transposition points being so loacted that, with regard to said undesired transmission paths, a number containing transposition are paired against an equal number not containing transposition so that the effective transmission over any group of undesired transmission paths is zero.

References Cited in the file of this patent

UNITED STATES PATENTS

| | | |
|---|---|---|
| 2,019,603 | Green | Nov. 5, 1935 |
| 2,035,536 | Cowan et al. | Mar. 31, 1936 |